June 10, 1930.  B. L. HUESMAN  1,762,629

VEHICLE BODY STRUCTURE

Filed June 25, 1928

INVENTOR
Burton L. Huesman
BY Chappell Earl
ATTORNEYS

Patented June 10, 1930

1,762,629

UNITED STATES PATENT OFFICE

BURTON L. HUESMAN, OF KALAMAZOO, MICHIGAN, ASSIGNOR TO LIMOUSINE BODY COMPANY, OF KALAMAZOO, MICHIGAN

VEHICLE BODY STRUCTURE

Application filed June 25, 1928. Serial No. 288,000.

The main objects of this invention are:

First, to provide a vehicle body having two doors on a side in which the doors are supported on a common post or upright and very close together.

Second, to provide a structure having these advantages in which the doors are very rigidly and securely supported and at the same time the structure is attractive in appearance, both when the doors are open and when closed.

Objects pertaining to details and economies of my invention will definitely appear from the description to follow. The invention is described in the claim.

A structure which embodies the features of my invention is clearly illustrated in the accompanying drawing, in which.

Figure 1:
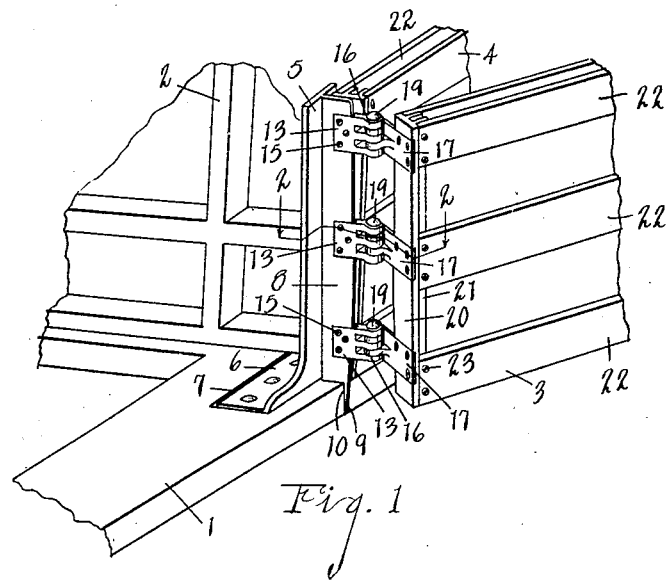
Fig. 1 is a fragmentary perspective view of portions of a motor vehicle body directly associated with my improvements.

Referring to the drawing, 1 represents the longitudinal bottom sill of a vehicle body and 2 the cross wall or structure constituting the support for the back of the front seat. 3 is the front door and 4 the rear door. It will be understood that the opposite side of the vehicle is commonly a duplicate of the parts here shown.

At the ends of the cross structure 2 I mount door posts or uprights 5 of T cross section and having a supporting flange 6 projecting inwardly and resting upon and secured to the top of the sill 1. The sill is preferably recessed at 7 to receive this attaching plate. The post is disposed with its intermediate arm or web 8 projecting outwardly, this arm having an extension 9 depending below the bottom plate 6 and arranged through a slot 10 in the sill. The arm 8 has seats 11 in its sides arranged in opposed pairs to receive the arms 12 of the fixed hinge member 13, the arms being formed by longitudinally slotting the hinge member 13 at 14 so that it embraces the arm 8 of the post. The hinge member fits within and is rigidly secured in the seats 11 by means of the screws 15.

Each hinge member 13 is provided with a plurality of spaced pintle ears 16.

Figure 2:
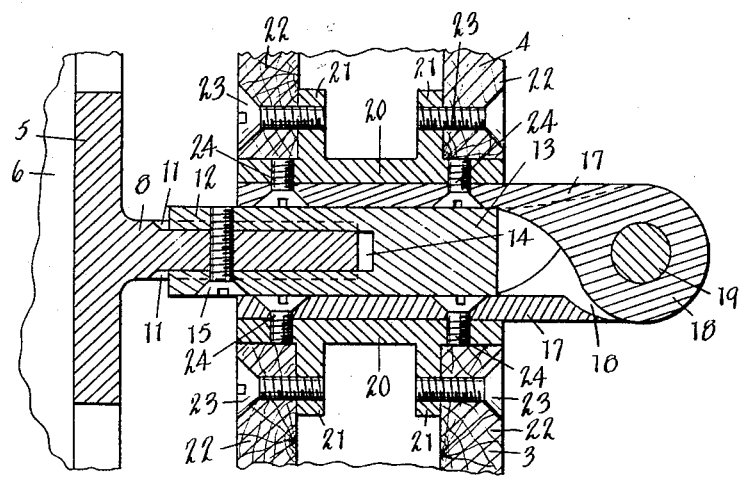
Fig. 2 is a fragmentary horizontal section on line 2—2 of Fig. 1.
Figure 3:
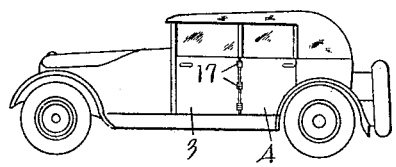
Fig. 3 is a side elevation of a vehicle body embodying the features of my invention.

A paid of swinging hinge members 17 is provided for each fixed hinge member, each having a knuckle 18 disposed between an adjacent pair of the pintle ears or knuckles 16 of the fixed hinge member. The pintles 19 are common to both hinge members 17. The knuckles 18 are offset inwardly so that the hinge members 17 may be secured to the rear edges of the doors and closed against the sides of the fixed hinge member as shown in Fig. 2.

Attaching plates 20 are provided for the doors and have arms 21 disposed between the door frame members 22 and secured thereto by the screws 23 arranged through the sides of the door. The hinge members 17 are secured to these attaching plates by means of the screws 24, thus providing a very secure connection for the doors to the hinge members.

My improvements are especially well adapted for vehicle bodies of the coach type and enable the employment of wide doors spaced only by the arm 8 of the door post, which is, as stated, alined with the front seat back wall or support 2 of the vehicle. Vehicles embodying my improvements are very attractive in appearance as the exposed edge of the post may be finished as desired.

Having thus described my invention what I claim as new and desire to secure by Letters Patent is:

The combination with a vehicle body including a longitudinal sill member and a pair of doors, of a door post of T cross section provided with an attaching plate at its lower end secured to the upper side of said longitudinal sill, the intermediate arm of said post being extended below said plate and being disposed to project outwardly, said sill being slotted to receive the projecting end of said intermediate arm, a plurality of fixed hinge members longitudinally slotted to embrace said intermediate arm of said post and secured thereto, said fixed hinge members each having a plurality of spaced pintle ears, a pair of swinging hinge members coacting with each fixed hinge member, said swinging hinge members having oppositely offset knuckles arranged between adjacent pairs of pivot ears of said fixed members and being disposed transversely of and secured to the rear edges of the doors, and a pintle for each hinge unit, and said pairs of swinging hinge members being adapted to close against opposite sides of the fixed hinge members when the doors are closed.

In witness whereof I have hereunto set my hand.

BURTON L. HUESMAN.